United States Patent
Both et al.

(10) Patent No.: US 11,415,550 B2
(45) Date of Patent: Aug. 16, 2022

(54) SENSOR AND PROCESSING PART FOR A SENSOR

(71) Applicant: Yokogawa Process Analyzers Europe B.V., Amersfoort (NL)

(72) Inventors: Teunis Both, Wilnis (NL); Ralph Richard de Leede, Amersfoort (NL)

(73) Assignee: YOKOGAWA PROCESS ANALYZERS EUROPE B.V., Amersfoort (NL)

( * ) Notice: Subject to any disclaimer, the term of this patent is extended or adjusted under 35 U.S.C. 154(b) by 316 days.

(21) Appl. No.: 16/495,374

(22) PCT Filed: Mar. 19, 2018

(86) PCT No.: PCT/NL2018/050172
§ 371 (c)(1),
(2) Date: Sep. 18, 2019

(87) PCT Pub. No.: WO2018/174709
PCT Pub. Date: Sep. 27, 2018

(65) Prior Publication Data
US 2020/0018725 A1    Jan. 16, 2020

(30) Foreign Application Priority Data
Mar. 22, 2017 (EP) .................................... 17162352

(51) Int. Cl.
*G01N 29/02* (2006.01)
*G01N 29/22* (2006.01)
*G01N 27/407* (2006.01)

(52) U.S. Cl.
CPC ........... *G01N 29/02* (2013.01); *G01N 29/222* (2013.01); *G01N 27/4078* (2013.01)

(58) Field of Classification Search
CPC .. G01N 29/02; G01N 29/222; G01N 27/4078; G01N 27/00
See application file for complete search history.

(56) References Cited

U.S. PATENT DOCUMENTS 6,173,600 B1   1/2001   Harada et al.
8,209,151 B2   6/2012   Gruaz et al.
(Continued)

FOREIGN PATENT DOCUMENTS

CN   1833243      9/2006
CN   101629835    1/2010
(Continued)

OTHER PUBLICATIONS

European Search Report & Search Opinion dated Sep. 15, 2017 for EP Patent Application No. 17162352.3.
(Continued)

*Primary Examiner* — Tarun Sinha
(74) *Attorney, Agent, or Firm* — Hoffmann & Baron, LLP

(57) ABSTRACT

The invention relates to a sensor for measuring a fluid parameter. The sensor comprises a sensing part for supplying a measurement data signal and a processing part releasably connected to the sensing part. The processing part comprises an identification recognition means capable of recognizing a presence of an identification means in the sensing part. Accordingly in the sensor a particular sensing part used may be recognized so that full functionality can be maintained when exchanging a recognized sensing part and more limited functionality is available when the sensing part is not recognized.

20 Claims, 2 Drawing Sheets

(56) References Cited

U.S. PATENT DOCUMENTS

| | | | |
|---|---|---|---|
| 2004/0010207 A1* | 1/2004 | Flaherty | A61B 5/15113 |
| | | | 600/573 |
| 2007/0126794 A1 | 6/2007 | Schick et al. | |
| 2009/0216147 A1* | 8/2009 | Van Eijkern | A61B 5/332 |
| | | | 600/547 |
| 2014/0187985 A1 | 7/2014 | Corl et al. | |
| 2016/0299096 A1 | 10/2016 | Greenwood et al. | |

FOREIGN PATENT DOCUMENTS

| | | |
|---|---|---|
| CN | 102369415 | 3/2012 |
| EP | 0544237 | 4/1998 |
| JP | P2000111506 A | 4/2000 |
| JP | 2004069377 A | 3/2004 |
| JP | 2005114697 A | 4/2005 |
| WO | 2005015130 | 2/2005 |
| WO | 2007018419 | 2/2007 |
| WO | 2007018419 A2 | 2/2007 |
| WO | 2010117585 | 10/2010 |

OTHER PUBLICATIONS

International Search Report & Written Opinion dated May 24, 2018 for PCT Patent Application No. PCT/NL2018/050172.

* cited by examiner

SENSOR AND PROCESSING PART FOR A SENSOR

CLAIM OF PRIORITY

This Application is a National Stage Entry of, and claims priority to, International Application No. PCT/NL2018/050172, filed Mar. 19, 2018, which claims priority to European Patent Application No. EP17162352.3, filed Mar. 22, 2017, both of which are incorporated by reference in their entireties for all purposes.

The present invention relates to a sensor for measuring a fluid parameter, the sensor comprising a fluid parameter sensing part for supplying a measurement data signal and a processing part releasably connected to the sensing part for transfer of the measurement data signal from the sensing part to the processing part, the processing part comprising a data processing unit for processing data obtained from the measurement data signal, a memory for storing the data processed by the processing means, a power/energy supply for operating at least the processing part of the sensor, and a digital communication interface for communicating data to an external read out device.

The sensor of the invention is typically a liquid or gas sensor, and may be used to measure a fluid parameter such as a pH-value or redox potential, temperature, dissolved oxygen value, or specific or inductive conductivity of particularly liquids. Known liquid or gas sensors usually comprise a fluid parameter sensing part such as an ion-selective electrode. For example known pH sensors may comprise a glass electrode which is sensitive to hydrogen ions and is capable of converting a sensed ionic concentration in the measured fluid into an electrical potential. The pH-dependent electrical potential produced by the fluid parameter sensing part may be sent via cable or transmitter to an electrical read out device such as an analyzer which can generate from the electrical potential a measurement signal representing the measured pH value of the measured fluid.

The simplest sensors for measuring fluid parameters almost entirely consist of the electrode. These sensors are usually coupled via a cable to an analyzer comprising the necessary electronics for providing a measurement signal and a power source for powering both the analyzer and the sensor. However such sensors coupled to an analyzer are not particularly suited for field work in which it may in many instances be cumbersome to bring the required analyzer. Accordingly sensors are known in which most of the electronics are provided in the sensor itself. Typically these sensors comprise a data processing unit for processing data obtained from the sensing part, a memory for storing the data processed by the data processing unit, a power/energy supply and a digital communication interface for the possibility to communicate data to an external device. These type of sensors are better suited for work at location as they do not require a separate comprehensive analyzer. However, in use sensors for measuring fluid parameters are often exposed to heavy wear, rendering it necessary to replace worn examples for newer versions after relatively few operations. This is inconvenient, as these type of sensors can be relatively costly products, particularly in view of the used electronic components.

Accordingly further sensors have been developed in which most of the electronics are housed in a separate processing part which is releasably connected to the fluid parameter sensing part. As the sensing part and processing part accordingly can be taken apart, in most cases it suffices to replace just the sensing part which is the main subject of wear. The relatively costly electronics in the separate processing part may be reused with a replacement sensing part. Known processing parts used in these sensors usually comprise within an outer housing a data processing unit for processing data obtained from the sensing part, a memory for storing the data processed by the data processing unit, a power/energy supply for operating the processing part, and a digital communication interface for communicating data to an external read out device. The outer housing comprises coupling means for releasable coupling to associated coupling means on an outer housing of a sensing part of the sensor.

Although these known sensors overcome the problem of having to replace the costly electronics, these have as a drawback that for adequate functionality of the sensor the processing part is dedicated to the sensing part with which it is coupled. It is particularly necessary that the sensing part is calibrated after coupling to the processing part for storing the calibration parameters in the processing part. Hence the sensing part needs to be recalibrated each time when connected to another processing part. Additionally, useful sensor information such as historical use data and manufacturing data may be absent or may be lost when the sensing part is coupled to another processing part.

An object of the present invention, amongst others, is to provide a sensor which overcomes the drawback of the known sensors.

In order to achieve this object a sensor of the type described in the first paragraph is according to the present invention characterized in that the processing part comprises an identification recognition means capable of recognizing a presence of an identification means in the sensing part. By providing the processing part with such identification recognition means it is possible to exchange the sensing part with identification means for another sensing part with identification means while maintaining dedicated functionality of the sensor. For example sensing part specific information, such as calibration data or other relevant data, may be available to the processing part when the identification recognition means recognize the identification means of the sensing part. Accordingly if the sensing part is recognized by the processing part, for instance because of a previous use or because of programming, full functionality of the sensor may be maintained when using different sensing parts, without the need to recalibrate or reprogram either the sensing parts or the processing part.

A preferred embodiment of the sensor according to the invention is characterized in that the processing part comprises control means for controlling an output provided by the processing part in dependence of a result by the identification recognition means. For example an output by the processing part of the sensor may differ when used with a sensing part having identification means recognized by the identification recognition means as compared to when used with a sensing part having identification means not recognized by the identification recognition means. Particularly, an output of the processing part may differ in what information is provided to a user of the sensor. More particularly, when the identification recognition means in the processing part recognize and approve the identification means present in the sensing part, specific information concerning the sensing part may be added to the output of the processing part. The specific information may for instance comprise history data of the used sensing part such as data concerning any previous measurements done with the sensing part, manufacturing data such as a date of manufacture, a place of manufacture, or a brand of the manufacturer of the sensing part, calibration data, and any other information which may or may not be related to the sensing part. Specific recognition of the identification means by the identification recognition means may also unlock one or more functionalities of the sensor, e.g. by activating pre-programmed functionalities stored in the memory of the processing part upon recognition. The particular output and functionality provided by the processing part may also vary in dependence of the level of approval or recognition of the identification means by the identification recognition means. Thus, when the sensor comprises a sensing part with identification means fully approved by the identification recognition means in the processing part, the control means will not limit the maximum functionality and/or data output of the sensor in any way and/or will provide full functionality and/or output data to the sensor, whereas a sensor comprising a sensing part with identification means not completely (i.e. partly) approved by the identification recognition means of the processing part will have more limited functionality and/or data output, and a sensor comprising a sensing part with no identification means or identification means not recognized or approved by the identification recognition means of the processing part, may have just basic functionality and/or data output.

The identification recognition means and the data processing unit of the processing part may be functionally separate means, with the data processing unit comprising a processor and the identification recognition means comprising another processor or chip reader for recognizing a presence of an identification means in the sensing part. However, in a further preferred embodiment the sensor according to the invention is characterized in that the processing part comprises a processor containing the identification recognition means and the data processing unit. The functional integration of both the data processing and identification recognition in one processor particularly saves on costs and space requirements.

A further preferred embodiment of the sensor according to the invention is characterized in that the identification recognition means comprise an ID chip reader for recognizing a presence of an ID chip in the sensing part. ID chips, such as a passive RFID tag, are widely available as relatively cheap and small components and are therefore suited to be provided in newly manufactured sensing parts as well as to be incorporated in many existing sensing parts. Accordingly in addition to new manufactured sensing parts also existing available sensing parts may be easily converted to a sensing part according to the invention by incorporating in the sensing part an ID chip recognized by the recognition means of the processing part.

In a further preferred embodiment the sensor according to the invention is characterized in that the processing part comprises an outer housing having coupling means for a releasable coupling of the processing part to associated coupling means provided on an outer housing of the sensing part.

In a particular embodiment the sensor according to the invention is characterized in that the coupling between the processing part and sensing part is a direct coupling. Alternatively the coupling between the processing part and sensing part may be an indirect coupling via a cable extending between the coupling means and associated coupling means of the processing part and sensing part.

A further preferred embodiment of the sensor according to the invention is characterized in that the coupling means comprise a connector with connector pins, preferably a Vario Pin connector, more preferably a Vario Pin connector having 8 or more connector pins.

A further particular embodiment of the sensor according to the invention is characterized in that the sensor sensing part is capable of measuring a fluid parameter of a liquid or a gas.

In a further preferred embodiment the sensor according to the invention is characterized in that the sensor sensing part is capable of measuring one or more fluid parameter including pH, specific conductivity, inductive conductivity and dissolved oxygen.

A particularly preferred embodiment of the sensor according to the invention is characterized in that the sensor sensing part is a glass electrode.

Although the sensor according to the present invention herein described is particularly useful with a sensing part comprising an identification means which is recognized by the identification recognition means of the processing part, it can also suitably be used with a sensing part to which it can be functionally coupled that does not comprise an identification means which is recognized by the identification recognition means of the processing part. As long as the sensing part and processing part can be functionally and communicatively coupled to each other, for instance via corresponding coupling means provided on the sensing part and processing part, the sensor can be used. In this case the output of the processing part may be limited, so that for instance possibly a recalibration of each sensing part is necessary when exchanged. The processing part may thus be used with any sensing part to which it can be functionally and communicatively coupled to form the sensor of the present invention, irrespective of whether the sensing part comprises an identification means recognizable by the identification recognition means of the processing part.

The present invention also relates to a processing part of a sensor for measuring a fluid parameter, comprising an outer housing provided with coupling means for releasable coupling to associated coupling means on an outer housing of a sensing part of the sensor, the processing part provided within the housing with a data processing unit for processing data obtained from a measurement data signal supplied by the sensing part, a memory for storing the data processed by the data processing unit, a power/energy supply for operating the processing part, and a digital communication interface for communicating data to an external read out device.

In a preferred embodiment the processing part according to the invention is characterized in that it comprises a processor containing the identification recognition means and the data processing unit.

In a further preferred embodiment the processing part according to the invention is characterized in that it comprises control means for controlling an output provided by the processing part in dependence of a result by the identification recognition means.

A particular embodiment of the processing part according to the invention is characterized in that the identification recognition means comprise an ID chip reader for recognizing when coupled to a sensing part a presence of an ID chip in the sensing part.

In another preferred embodiment the processing part according to the invention is characterized in that it comprises an outer housing having coupling means for a releasable coupling to associated coupling means provided on an outer housing of a sensing part.

A further particular embodiment of the processing part according to the invention is characterized in that the coupling means are adapted for direct coupling to the coupling means of the sensing part, or for indirect coupling via a cable extending between the coupling means and associated coupling means of the sensing part.

Another particular embodiment of the processing part according to the invention is characterized in that the coupling means comprise a connector with connector pins, preferably a Vario Pin connector, more preferably a Vario Pin connector having 8 or more connector pins.

The present invention further relates to a fluid parameter sensing part of a sensor for measuring a fluid parameter, having an outer housing provided with coupling means intended for releasable coupling to associated coupling means of a processing part of the sensor and having means for supplying a measurement data signal to the processing part, the outer housing enclosing an ID-chip comprising sensing part-specific data readable by an ID chip reader of the processing part.

These and other aspects of the present invention are further elucidated by the appended drawing and the corresponding embodiments described hereinafter, which form part of the present application. The drawing and embodiments are not in any way meant to reflect a limitation of the scope of the invention, unless this is clearly and explicitly indicated.

Figure 1:
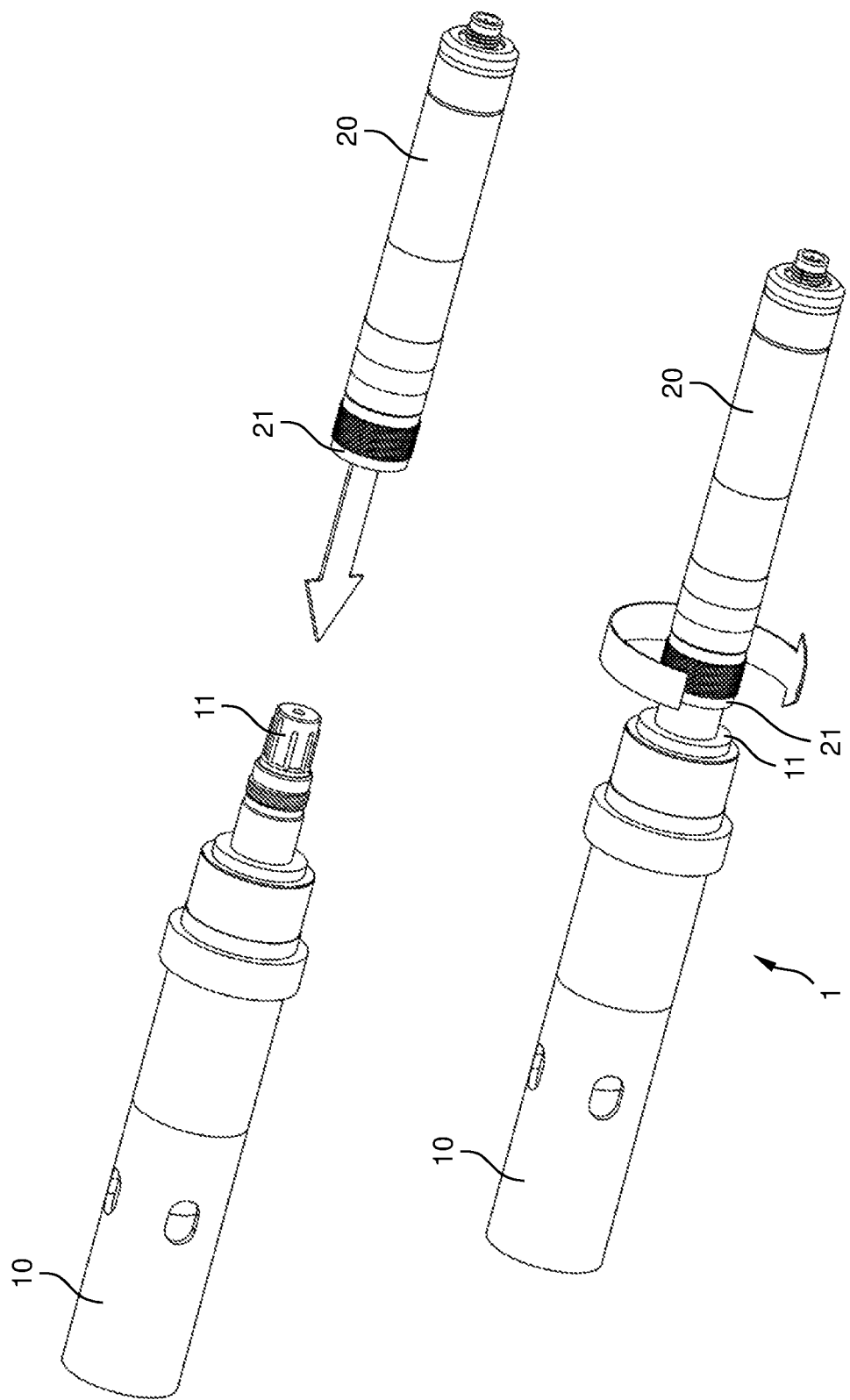
FIG. 1 illustrates a perspective view of an embodiment of a sensor according to the invention with respectively a sensing part and processing part of the sensor separated from each other and a sensing part and processing part of the sensor directly coupled to each other.

As is shown in FIG. 1 the sensor 1 according to the invention comprises a sensing part 10 and a separate processing part 20 which can be directly coupled to each other. Hereto the sensing part and processing part each comprise connecting means for mutual connection of the parts. The processing part 20 according to the invention comprises a cylindrical outer housing which on one end comprises the connecting means 21 for direct coupling to corresponding connecting means 11 of the sensing part 10 of the sensor. In this particular embodiment the sensing part 10 comprises a male Vario Pin connector which can be operatively coupled to a female Vario Pin connector of the processing part. The Vario Pin connector comprises 8 pins, each pin programmed with designated functionality. Three of the pins are designated for detection and recognition of a possible ID chip provided in the sensing part, i.e. one DATA pin and two integrated circuits (IC) power supply pins (e.g. Vcc and ground). The other five pins are designated in dependence of the type of sensor and the type of fluid parameter to be measured, e.g. pH, SC, ISC or DO.

Figure 2:
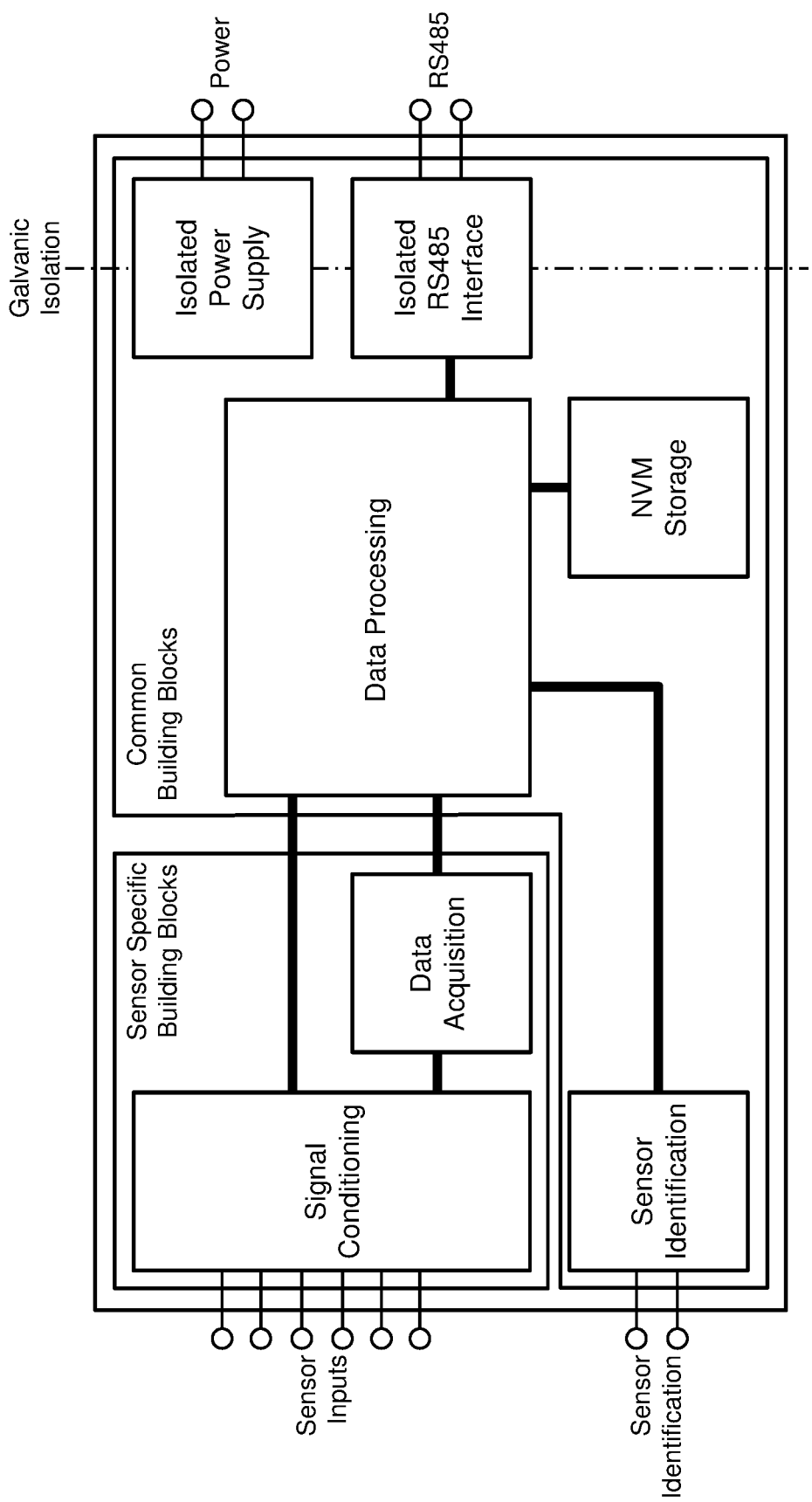
FIG. 2 illustrates a schematic representation of an embodiment of the processing part according to the invention.

As is shown in FIG. 2 the processing part according to the invention comprises within the outer housing a data processing unit for processing data obtained from the measurement data signal provided by the sensing part. The data processing unit comprises a microprocessor which is functionally coupled to a memory means in the form of a non-volatile memory (NVM storage) for storing the data processed by the processing means. The microprocessor is further coupled to a separate ID chip reader for processing ID chip recognition data provided by the ID chip reader when a sensing part with recognized ID chip is used in the sensor. The microprocessor provides an output via an isolated RS485 digital communication interface which is used to enable communicating of the output data to an external read out device, such as a suitable display or monitor. The output data provided by the microprocessor may differ in dependence of a recognition of an ID chip in the sensing part by the ID chip reader in the processing part. The components of the processing part are supplied with power by a galvanically isolated power/energy supply which operates both the processing part of the sensor and the sensing part of the sensor. Hereto power supplied by the power supply can be provided to the sensing part via the coupling means.

For the purpose of clarity and a concise description, features are described herein as part of the same or separate aspects and preferred embodiments thereof, however, it will be appreciated that the scope of the invention may include embodiments having combinations of all or some of the features described.

The invention claimed is:

1. A sensor for measuring a fluid parameter, the sensor comprising:
a fluid parameter sensing part for supplying a measurement data signal; and
a processing part releasably connected to the fluid parameter sensing part for transfer of the measurement data signal from the fluid parameter sensing part to the processing part, the processing part comprising a data processing unit for processing data obtained from the measurement data signal, a memory for storing the data processed by the data processing unit, a power/energy supply for operating at least the processing part of the sensor, and a digital communication interface for communicating data to an external read out device, wherein the processing part comprises an identification recognition means capable of recognizing a presence of an identification means in the fluid parameter sensing part, and the processing part comprises control means for controlling an output provided by the processing part, wherein the control means are arranged to activate pre-programmed functionalities stored in the memory in dependence of a level of approval or recognition of the identification means by the identification recognition means.

2. The sensor of claim 1, wherein the processing part comprises a processor containing the identification recognition means and the data processing unit.

3. The sensor of claim 1, wherein the identification recognition means comprise an ID chip reader for recognizing a presence of an ID chip in the fluid parameter sensing part.

4. The sensor of claim 1, wherein the processing part comprises an outer housing having coupling means for a releasable coupling of the processing part to associated coupling means provided on an outer housing of the fluid parameter sensing part.

5. The sensor of claim 4, wherein the coupling means comprise a connector with connector pins.

6. The sensor of claim 4, wherein the coupling means comprise a Vario Pin connector.

7. The sensor of claim 4, wherein the coupling means comprise a Vario Pin connector having 8 or more connector pins.

8. The sensor of claim 1, wherein the fluid parameter sensing part is capable of measuring one or more fluid parameters comprising at least one of pH, specific conductivity, inductive conductivity, or dissolved oxygen.

9. A processing part of a sensor for measuring a fluid parameter, the processing part comprising:
an outer housing provided with coupling means for releasable coupling to associated coupling means of a fluid parameter sensing part of the sensor, the processing part provided within the housing with a data processing unit for processing data obtained from a measurement data signal supplied by the fluid parameter sensing part, a memory for storing the data processed by the data processing unit, a power/energy supply for operating the processing part, and a digital communication interface for communicating data to an external read out device, wherein the processing part comprises an identification recognition means capable of recognizing a presence of an identification means in the fluid parameter sensing part and the processing part comprises control means for controlling an output provided by the processing part in dependence of a result by the identification recognition means, wherein the control means are arranged to activate pre-programmed functionalities stored in the memory in dependence of a level of approval or recognition of the identification means by the identification recognition means.

10. The processing part of claim 9, wherein the processing part comprises a processor containing the identification recognition means and the data processing unit.

11. The processing part of claim 9, wherein the processing part comprises control means for controlling an output provided by the processing part in dependence of a result by the identification recognition means.

12. The processing part of claim 9, wherein the identification recognition means comprise an ID chip reader for recognizing a presence of an ID chip in the fluid parameter sensing part.

13. The processing part of claim 9, wherein the associated coupling means is provided on an outer housing of the fluid parameter sensing part.

14. The processing part of claim 13, wherein the coupling means are adapted for direct coupling to the associated coupling means of the fluid parameter sensing part, or for indirect coupling via a cable extending between the coupling means and the associated coupling means of the fluid parameter sensing part.

15. The processing part of claim 13, wherein the coupling means comprise a connector with connector pins.

16. The processing part of claim 13, wherein the coupling means comprise a Vario Pin connector.

17. The processing part of claim 13, wherein the coupling means comprise a Vario Pin connector having 8 or more connector pins.

18. A fluid parameter sensing part of a sensor for measuring a fluid parameter, comprising:
an outer housing provided with coupling means configured for releasable coupling to associated coupling means of a processing part of the sensor and having means for supplying a measurement data signal to the processing part, the outer housing enclosing an ID-chip comprising sensing part-specific data readable by an ID chip reader of the processing part, the ID-chip being configured to be fully approved by the processing part to enable activation of all pre-programmed functionalities stored in a memory of the processing part.

19. The fluid parameter sensing part of claim 18, wherein the fluid parameter sensing part is capable of measuring one or more fluid parameters comprising at least one of pH, specific conductivity, inductive conductivity, or dissolved oxygen.

20. The sensor according to claim 1, characterized in that the sensing part is one of:
(i) a sensing part with identification means fully approved by the identification recognition means;
(ii) a sensing part with identification means partly approved by the identification recognition means; and
(iii) a sensing part with no identification means or identifications means not recognized or approved by the identification recognition means;
wherein the control means of the processing part are arranged to not limit the maximum functionality and/or data output of the sensor in any way and/or will provide full functionality and/or output data when the sensing part is in accordance with (i);
wherein the control means of the processing part are arranged to provide more limited functionality and/or data output when the sensing part is in accordance with (ii); and
wherein the control means of the processing part are arranged to provide just basic functionality and/or data output when the sensing part is in accordance with (iii).

* * * * *